United States Patent
Yoshimi et al.

(10) Patent No.: US 9,399,377 B2
(45) Date of Patent: Jul. 26, 2016

(54) VEHICLE SUSPENSION DEVICE

(75) Inventors: Tsuyoshi Yoshimi, Susono (JP); Shingo Koumura, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 13 days.

(21) Appl. No.: 14/379,880

(22) PCT Filed: Feb. 23, 2012

(86) PCT No.: PCT/JP2012/054460
§ 371 (c)(1),
(2), (4) Date: Aug. 20, 2014

(87) PCT Pub. No.: WO2013/125017
PCT Pub. Date: Aug. 29, 2013

(65) Prior Publication Data
US 2015/0035247 A1 Feb. 5, 2015

(51) Int. Cl.
B60G 3/20 (2006.01)
B60G 3/18 (2006.01)
B60G 7/02 (2006.01)
F16F 1/387 (2006.01)

(52) U.S. Cl.
CPC .. *B60G 3/18* (2013.01); *B60G 3/20* (2013.01); *B60G 7/02* (2013.01); *B60G 2204/143* (2013.01); *B60G 2204/4104* (2013.01); *F16F 1/3873* (2013.01)

(58) Field of Classification Search
CPC ...... B60G 3/20; B60G 7/02; B60G 2204/143; B60G 2204/4104
See application file for complete search history.

(56) References Cited

U.S. PATENT DOCUMENTS

2007/0227789 A1* 10/2007 Imura ................ B60K 6/44
180/65.235

FOREIGN PATENT DOCUMENTS

| JP | 9-142121 | 6/1997 |
| JP | 9-240235 | 9/1997 |
| JP | 2005-96587 | 4/2005 |
| JP | 2007-22106 | 2/2007 |

OTHER PUBLICATIONS

International Search Report issued May 29, 2012, in PCT/JP12/054460 filed Feb. 23, 2012.

* cited by examiner

*Primary Examiner* — Faye M Fleming
(74) *Attorney, Agent, or Firm* — Oblon, McClelland, Maier & Neustadt, L.L.P.

(57) ABSTRACT

A vehicle suspension device includes a suspension device main body configured to support a wheel of a vehicle to a vehicle body of the vehicle; an upper intervening member configured to be intervened between a vertically upper portion of the suspension device main body and the vehicle body so that a front-back stiffness of the vehicle is relatively decreased at a time of smooth-braking of the vehicle at which an absolute value of a braking force of the vehicle is relatively small, compared to at a time of non-braking of the vehicle; and a lower intervening member configured to be intervened between a vertically lower portion of the suspension device main body and the vehicle body so that the front-back stiffness of the vehicle is relatively increased at the time of smooth-braking of the vehicle, compared to at the time of non-braking of the vehicle.

3 Claims, 10 Drawing Sheets

VEHICLE SUSPENSION DEVICE

FIELD

The present invention relates to a vehicle suspension device.

BACKGROUND

As a conventional vehicle suspension device, for example, in Patent Literature 1, an axle-type suspension device which is configured to include an upper control link, a lower control link, and elastic bushings is disclosed. In the axle-type suspension device, one ends of the upper control link and the lower control link are connected to the axle side and the other ends thereof are connected to the vehicle body side, and the elastic bushings are disposed on at least one end side of the upper control link and the lower control link, thereby forming a connection structure. In addition, in the axle-type suspension device, among the elastic bushings, the elastic bushing that is disposed in at least one of the upper control link and the lower control link is set so that the stiffness thereof in a vehicle front-back direction is higher in the compression direction than in the tensile direction. Accordingly, the axle-type suspension device absorbs a so-called harshness input, thereby reducing a change in the nose angle of the differential at the time of starting or braking the vehicle.

CITATION LIST

Patent Literature

Patent Literature 1: Japanese Patent Application Laid-open No. 2007-22106

SUMMARY

Technical Problem

However, in the axle-type suspension device described in Patent Literature 1 as described above, for example, there is still room for improvement in terms of a more appropriate reduction in vibration.

The present invention has been made taking the forgoing circumstances into consideration, and an object thereof is to provide a vehicle suspension device capable of appropriately reducing vibration.

Solution to Problem

In order to achieve the above mentioned object, a vehicle suspension device according to the present invention includes a suspension device main body configured to support a wheel of a vehicle to a vehicle body of the vehicle; an upper intervening member configured to be intervened between a vertically upper portion of the suspension device main body and the vehicle body so that a front-back stiffness of the vehicle is relatively decreased at a time of smooth-braking of the vehicle at which an absolute value of a braking force of the vehicle is relatively small, compared to at a time of non-braking of the vehicle; and a lower intervening member configured to be intervened between a vertically lower portion of the suspension device main body and the vehicle body so that the front-back stiffness of the vehicle is relatively increased at the time of smooth-braking of the vehicle, compared to at the time of non-braking of the vehicle.

Further, in the vehicle suspension device, it is possible to configure that the front-back stiffness of the upper intervening member and the front-back stiffness of the lower intervening member are set so that a front-back force compliance of a spindle of the wheel at the time of smooth-braking of the vehicle and a front-back force compliance of the spindle at the time of non-braking of the vehicle are equal to each other.

Further, in the vehicle suspension device, it is possible to configure that in the upper intervening member, the front-back stiffness of the vehicle is relatively increased at a time of sudden-braking of the vehicle at which an absolute value of a braking force of the vehicle is relatively greater than that at the time of smooth-braking of the vehicle, compared to at the time of smooth-braking of the vehicle.

Advantageous Effects of Invention

The vehicle suspension device according to the present invention exhibits an effect in which vibration can be appropriately reduced.

DESCRIPTION OF EMBODIMENTS

Hereinafter, embodiments according to the present invention will be described in detail with reference to the drawings. The present invention is not limited by the embodiments. In addition, the constituent elements in the following embodiments include elements that can be replaced or are easily replaced by those skilled in the art or substantially the same elements.

Embodiment

Figure 1:
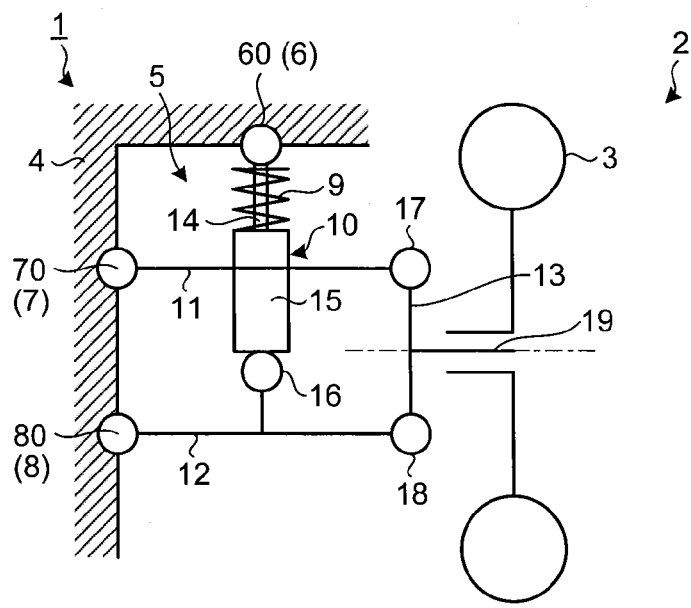
FIG. 1 is a schematic view illustrating the schematic configuration of a vehicle suspension device according to an embodiment.
Figure 2:
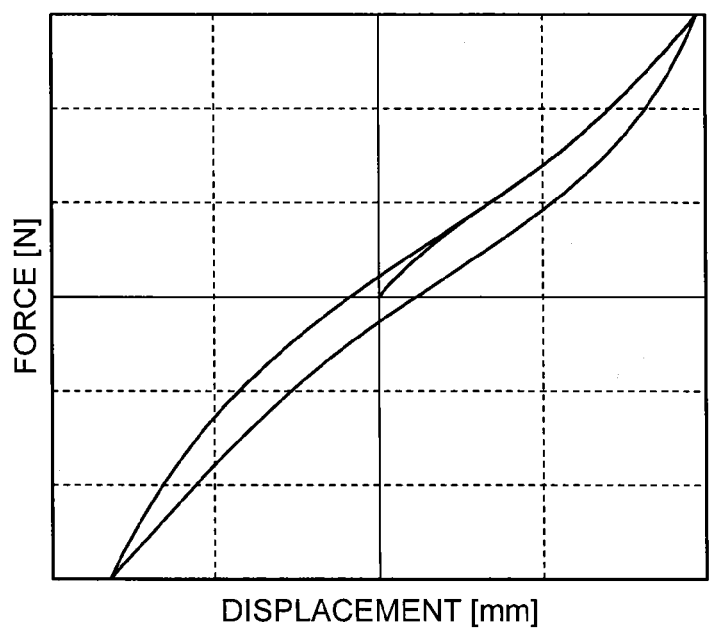
FIG. 2 is a diagram illustrating an example of the relation between displacement and force of a rubber bushing.
Figure 3:
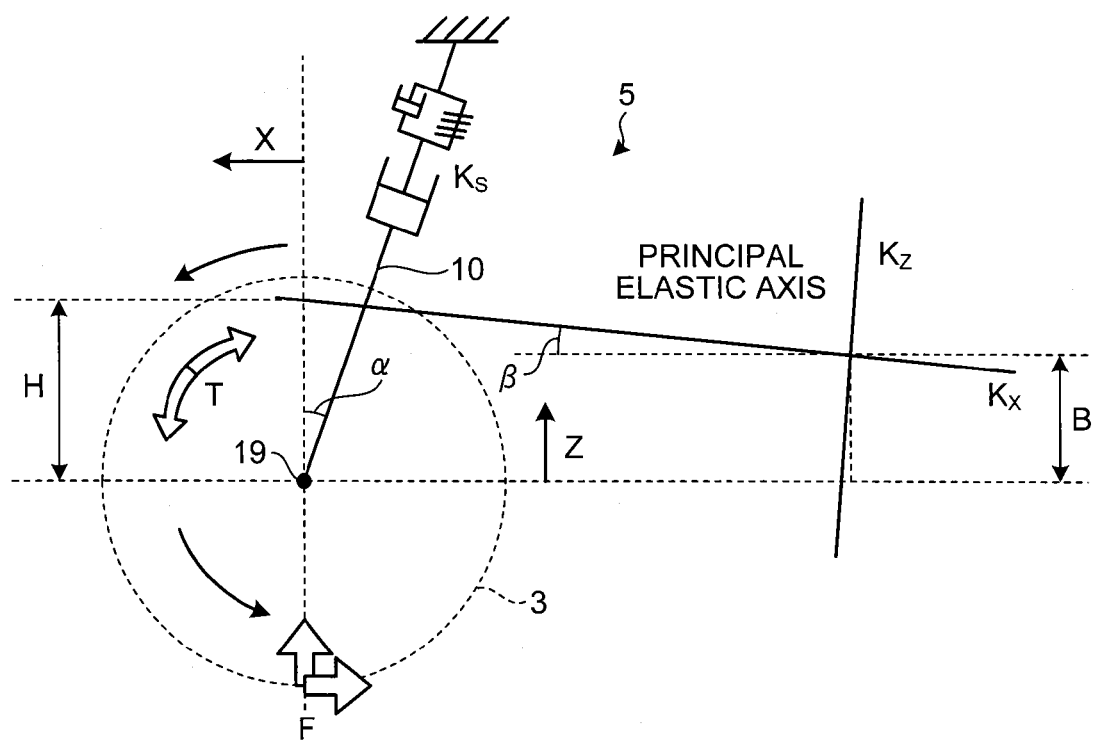
FIG. 3 is a schematic view simply illustrating a suspension in a side view.
Figure 4:
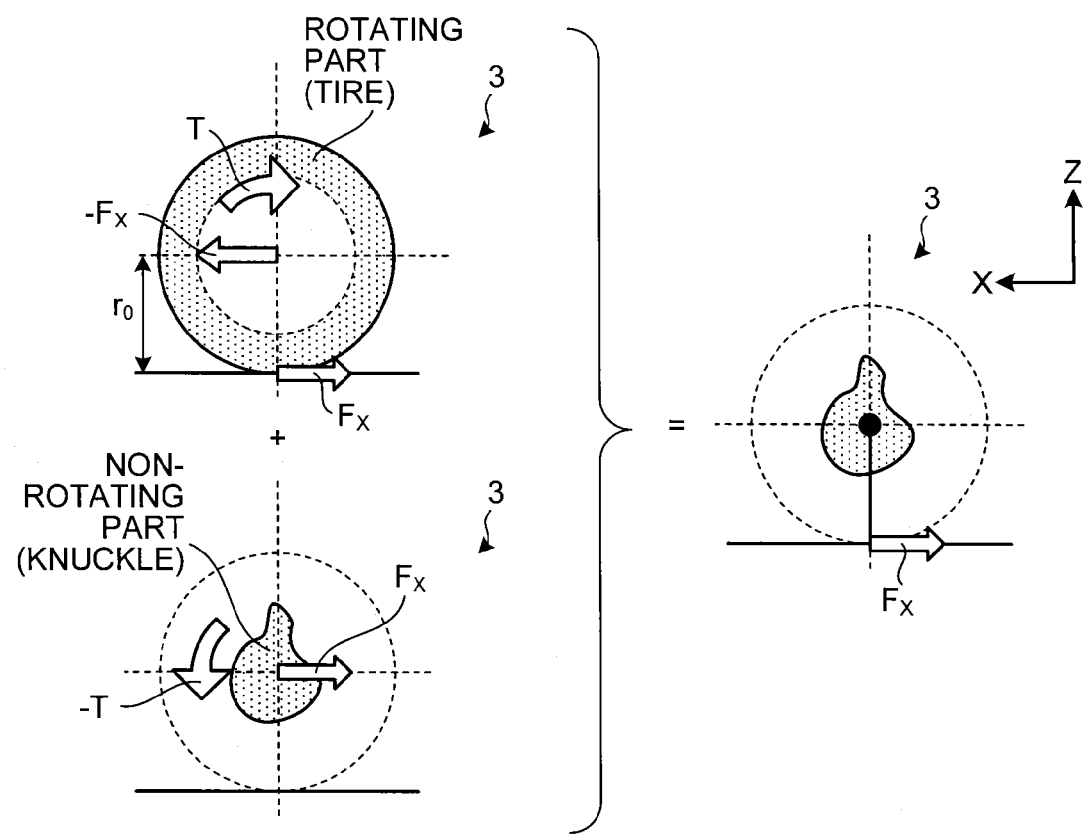
FIG. 4 is a schematic view illustrating the relation of unsprung forces of a braking torque.
Figure 5:
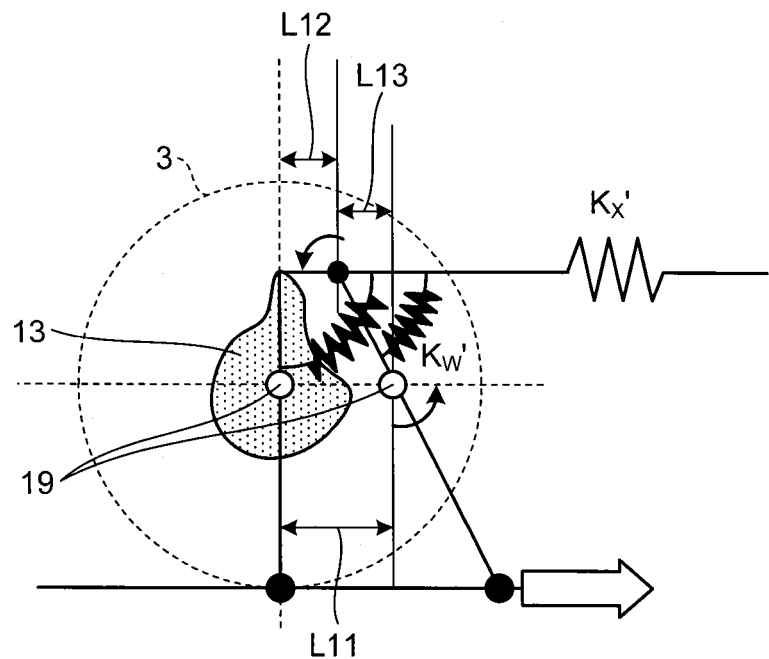
FIG. 5 is a schematic view illustrating the relation between a principal elastic axis height and a spindle front-back displacement.
Figure 6:
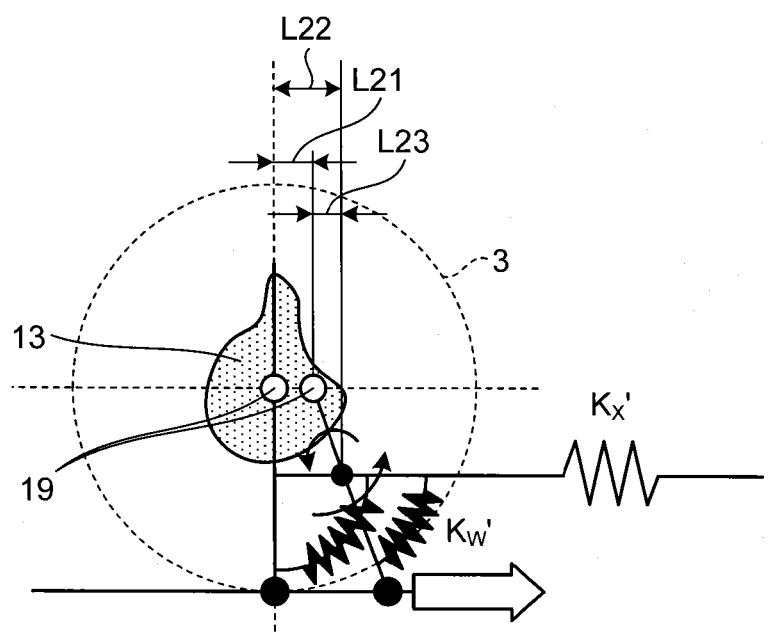
FIG. 6 is a schematic view illustrating the relation between the principal elastic axis height and the spindle front-back displacement.
Figure 7:
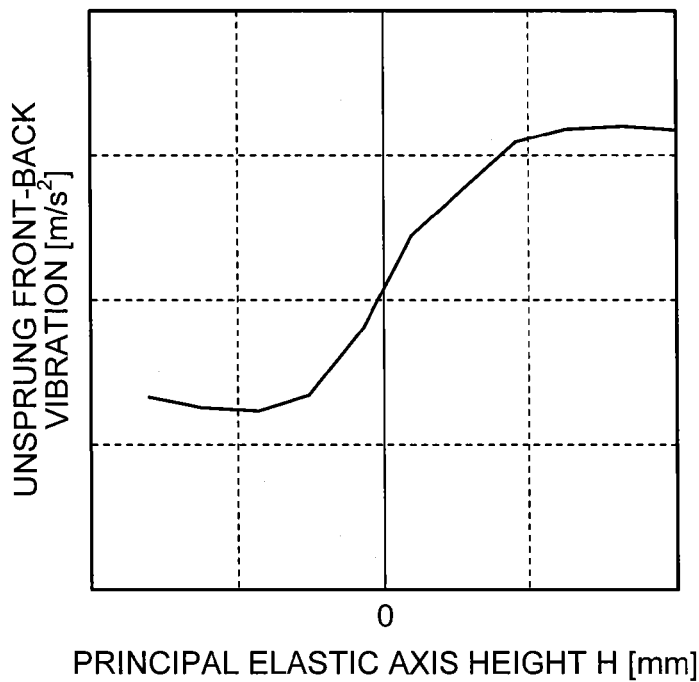
FIG. 7 is a diagram illustrating an example of the relation between the principal elastic axis height and unsprung vibration.
Figure 8:
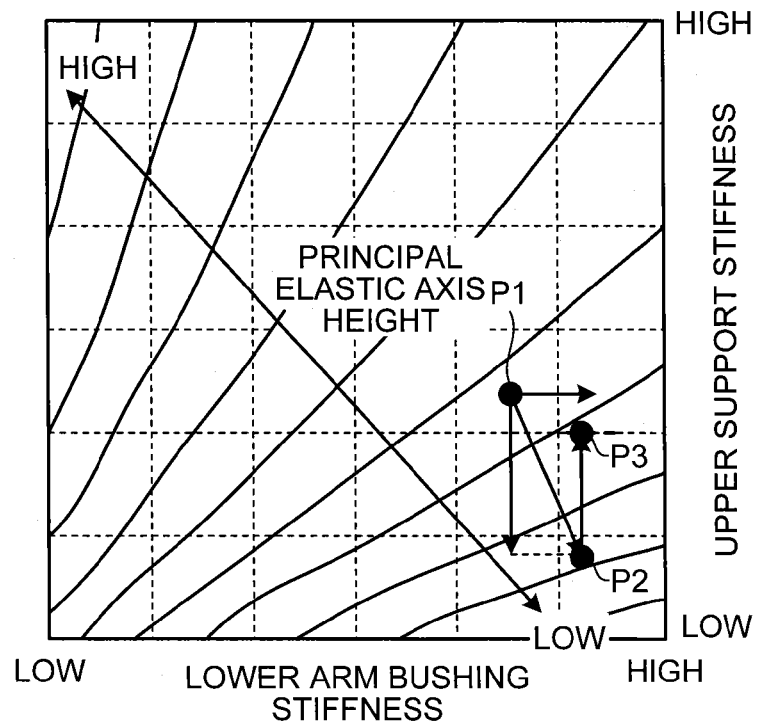
FIG. 8 is a diagram illustrating an example of the relation between a front-back stiffness of an upper support, a front-back stiffness of a lower arm bushing, and the principal elastic axis height.
Figure 9:
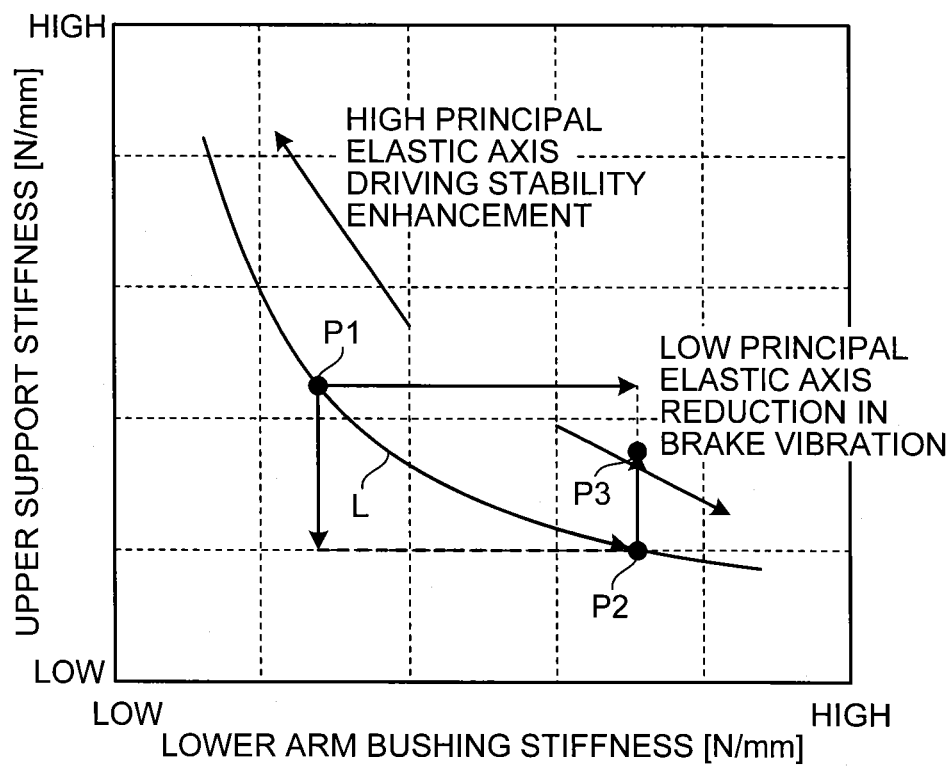
FIG. 9 is a diagram illustrating an example of a combination of the front-back stiffness in which a front-back force compliance at a spindle position is constant.
Figure 10:
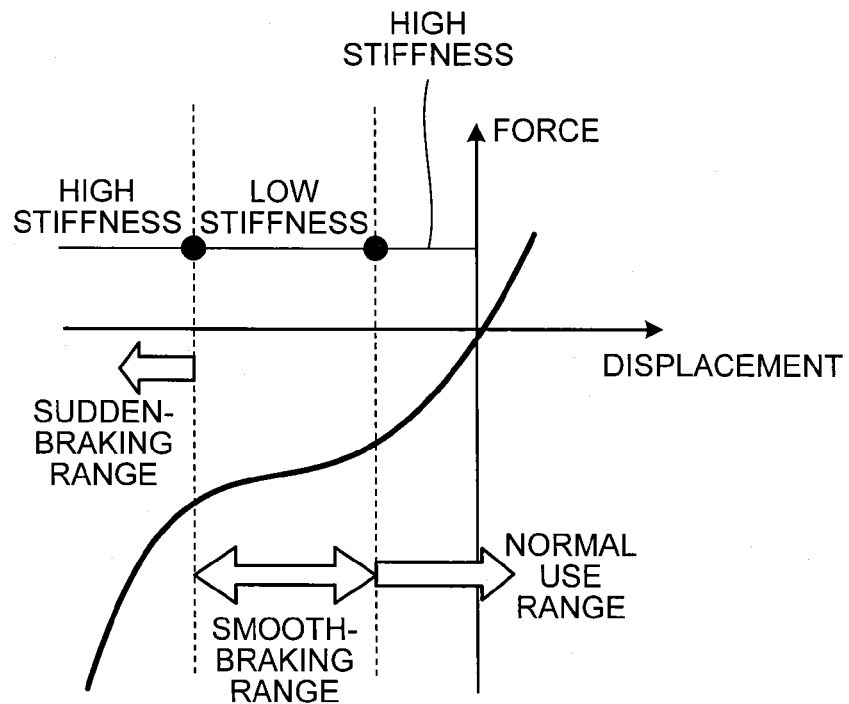
FIG. 10 is a diagram illustrating an example of the relation between displacement and force of the upper support.
Figure 11:
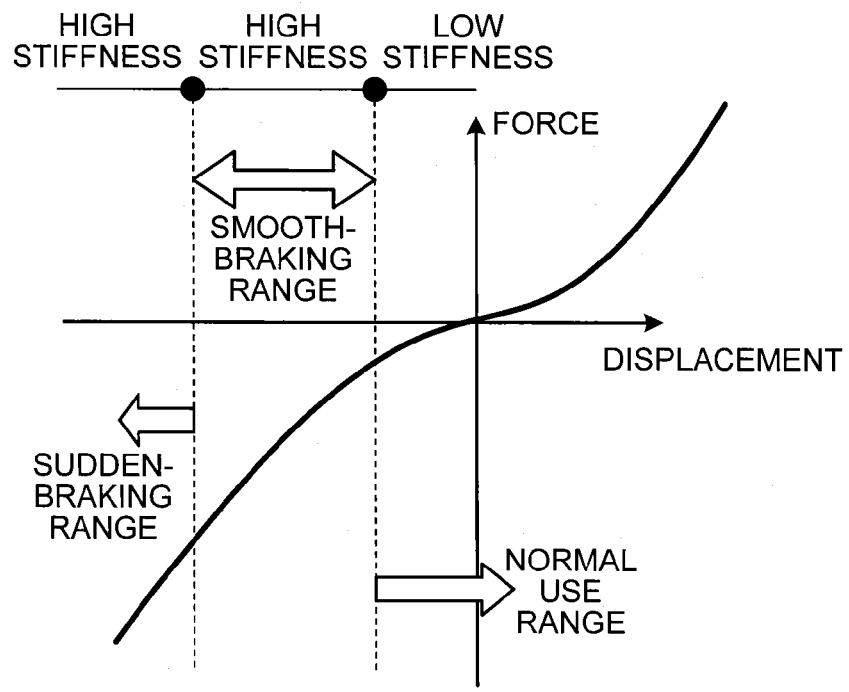
FIG. 11 is a diagram illustrating an example of the relation between displacement and force of the lower arm bushing.
Figure 12:
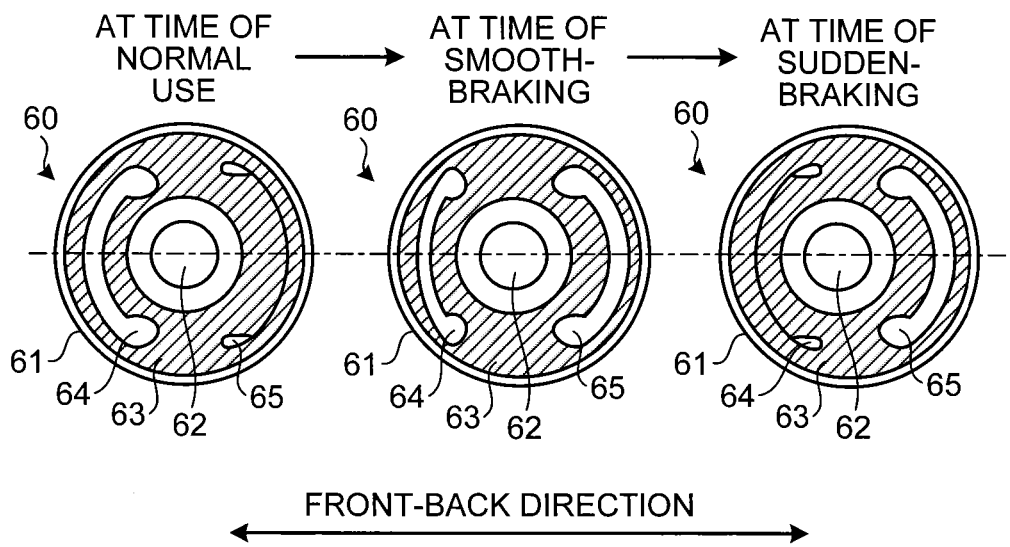
FIG. 12 is a schematic view illustrating an example of the schematic configuration of the upper support.
Figure 13:
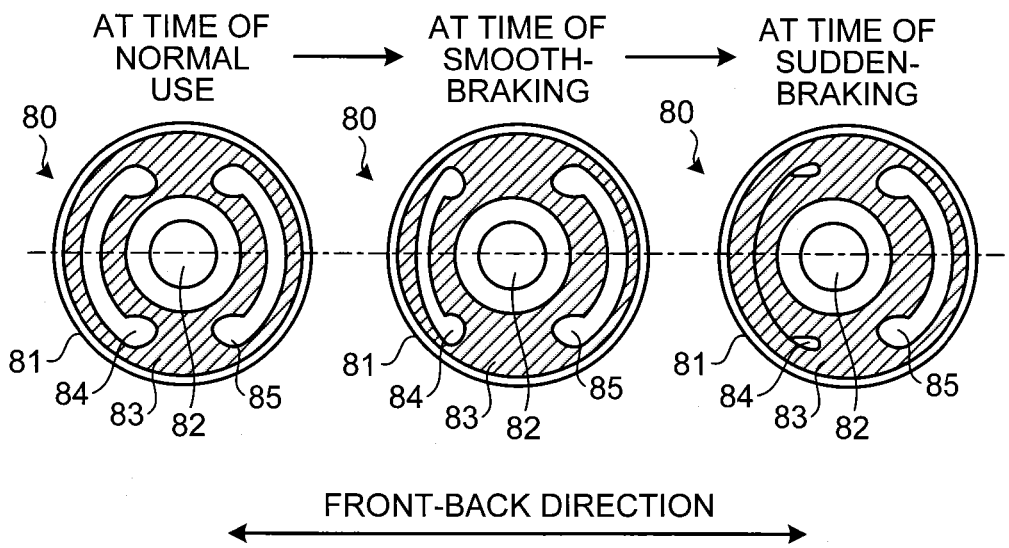
FIG. 13 is a schematic view illustrating an example of the schematic configuration of the lower arm bushing.
Figure 14:
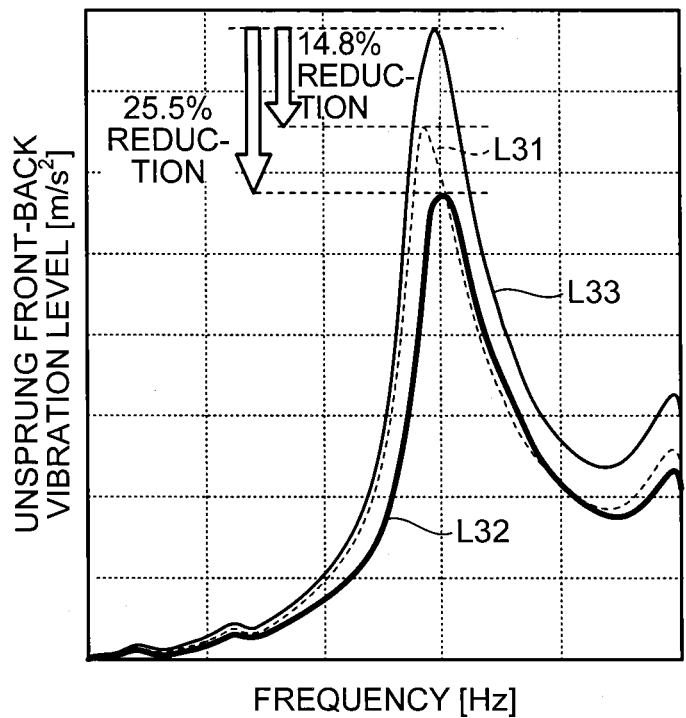
FIG. 14 is a diagram illustrating an example of actually measured values of the relation between the principal elastic axis height and the unsprung vibration at the time of inputting the braking torque.
Figure 15:
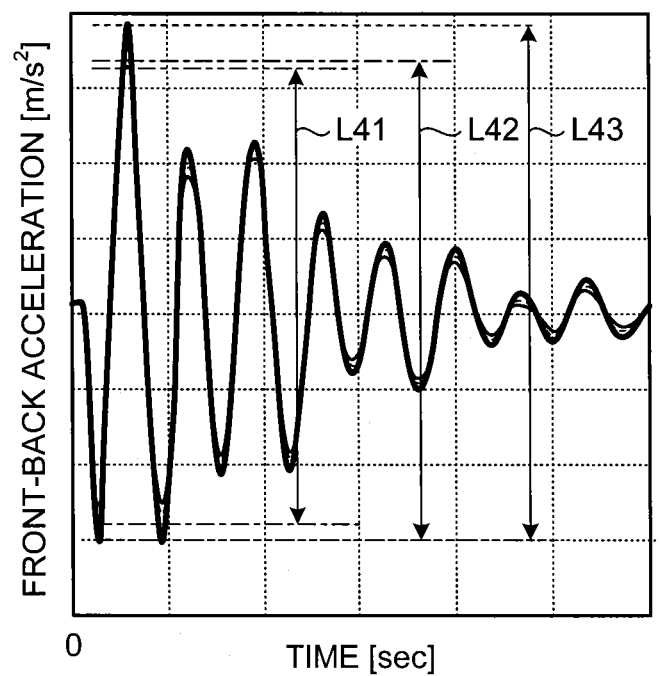
FIG. 15 is a diagram illustrating an example of the result of calculating harshness characteristics at the time of changing the principal elastic axis height.
Figure 16:
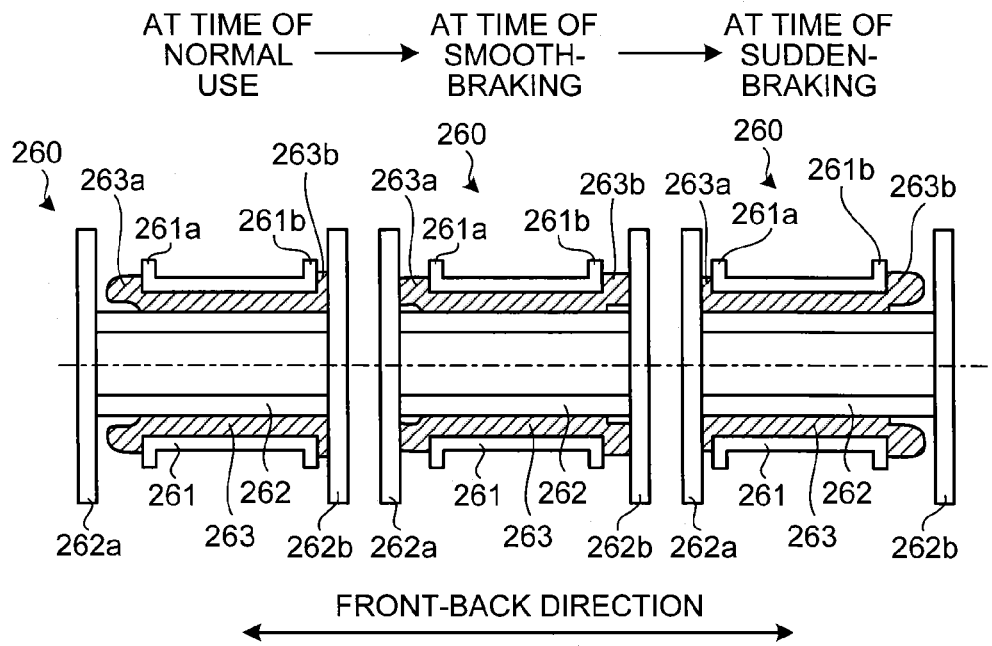
FIG. 16 is a schematic view illustrating another example of the schematic configuration of the upper support.
Figure 17:
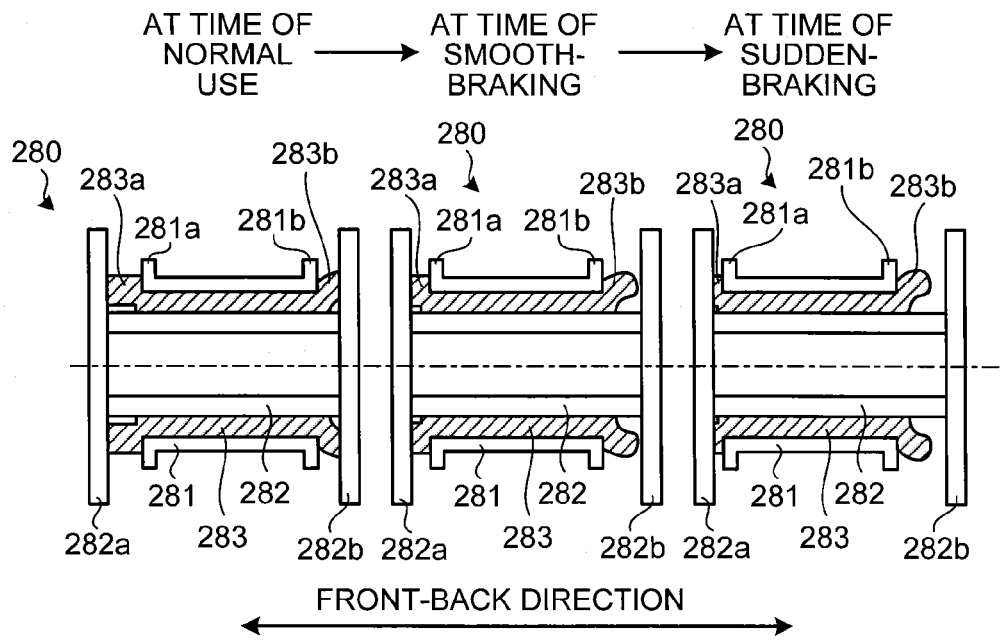
FIG. 17 is a schematic view illustrating another example of the schematic configuration of the lower arm bushing.

FIG. 1 is a schematic view illustrating the schematic configuration of a vehicle suspension device according to an embodiment. FIG. 2 is a diagram illustrating an example of the relation between displacement and force of a rubber bushing. FIG. 3 is a schematic view simply illustrating a suspension in a side view. FIG. 4 is a schematic view illustrating the relation of unsprung forces of a braking torque. FIGS. 5 and 6 are schematic views illustrating the relation between a principal elastic axis height and a spindle front-back displacement. FIG. 7 is a diagram illustrating an example of the relation between the principal elastic axis height and unsprung vibration. FIG. 8 is a diagram illustrating an example of the relation between a front-back stiffness of an upper support, a front-back stiffness of a lower arm bushing, and the principal elastic axis height. FIG. 9 is a diagram illustrating an example of a combination of the front-back stiffness in which a front-back force compliance at a spindle position is constant. FIG. 10 is a diagram illustrating an example of the relation between displacement and force of the upper support. FIG. 11 is a diagram illustrating an example of the relation between displacement and force of the lower arm bushing. FIG. 12 is a schematic view illustrating an example of the schematic configuration of the upper support. FIG. 13 is a schematic view illustrating an example of the schematic configuration of the lower arm bushing. FIG. 14 is a diagram illustrating an example of actually measured values of the relation between the principal elastic axis height and the unsprung vibration at the time of inputting the braking torque. FIG. 15 is a diagram illustrating an example of the result of calculating harshness characteristics at the time of changing the principal elastic axis height. FIG. 16 is a schematic view illustrating another example of the schematic configuration of the upper support. FIG. 17 is a schematic view illustrating another example of the schematic configuration of the lower arm bushing.

A vehicle suspension device 1 according to this embodiment is provided to correspond to each of wheels 3 of a vehicle 2 as illustrated in FIG. 1. The vehicle suspension device 1 is configured to include a suspension 5 as a suspension device main body which supports the wheels 3 of the vehicle 2 to a vehicle body 4 of the vehicle 2, and an upper connecting portion 6, an intermediate connecting portion 7, and a lower connecting portion 8, which connect the suspension 5 to the vehicle body 4. In the vehicle suspension device 1, the upper connecting portion 6, the intermediate connecting portion 7, and the lower connecting portion 8 are provided in this order from above in the vertical direction with respect to the suspension 5. In addition, the vehicle suspension device 1 of this embodiment is a vibration reducing device which reduces unsprung vibration at the time of braking due to the principal elastic axis height of the suspension 5.

Here, the principal elastic axis of the suspension 5 is typically referred to as three virtual orthogonal axes in which, when a force is applied along a specific axial direction, the direction of the force and the direction of an elastic displacement of the force application point are coincident with each other and a plane including the force application point undergoes only linear displacement and does not cause angular displacement, in other words, the center of elastic restoration. The principal elastic axis of the suspension 5 is typically determined by the characteristics of the suspension 5, and is determined according to, for example, the strength or the arrangement of the springs of the suspension 5, the stiffness (spring constant) of the bushing of each part, and the like. In addition, unsprung vibration is typically unsprung vibration of the vehicle 2, that is, vibration that occurs on the wheels 3 side rather than the suspension 5.

Specifically, the suspension 5 is intervened between the wheels 3 and the vehicle body 4 to support the wheels 3 to the vehicle body 4 and reduces impact or vibration that is transmitted from the road surface to the vehicle body 4 via the wheels 3. The suspension 5 is configured to include a coil spring 9, a shock absorber 10, an upper arm 11, a lower arm 12, a knuckle 13, and the like and supports the wheels 3 to be steerable and rotatable relative to the vehicle body 4.

The coil spring 9 elastically supports unsprung parts to sprung parts, that is, to the vehicle body 4, to support the weight of the sprung parts of the vehicle 2, and allows vibration or impact from the road surface not to be transmitted to the vehicle body 4 through the wheels 3. The shock absorber 10 has a piston rod 14 to which the coil spring 9 is attached, and attenuates vertical vibration of the vehicle body 4 due to the coil spring 9. The shock absorber 10 is disposed along the vertical direction so that the vertically upper end portion of the piston rod 14 is connected to the vehicle body 4 via the upper connecting portion 6, and the vertically lower end portion of a cylinder 15 is connected to the lower arm 12 via a joint portion 16 such as a ball joint. The upper arm 11 and the lower arm 12 are suspension arms that support the shock absorber 10, the knuckle 13, and the like, and the upper arm 11 is disposed on the upper side in the vertical direction and the lower arm 12 is disposed on the lower side in the vertical direction. One end portion (outer end portion in the vehicle width direction) of the upper arm 11 is connected to the upper end portion of the knuckle 13 via a joint portion 17 such as a ball joint, and the other end (inner end portion in the vehicle width direction) thereof is connected to the vehicle body 4 via the intermediate connecting portion 7. One end portion (outer end portion in the vehicle width direction) of the lower arm 12 is connected to the lower end portion of the knuckle 13 via a joint portion 18 such as a ball joint, and the other end (inner end portion in the vehicle width direction) thereof is connected to the vehicle body 4 via the lower connecting portion 8. The knuckle 13 is a non-rotating part, and is a wheel support member which supports the wheels 3 to rotate about a spindle 19 as the rotation center. In addition, the knuckle 13 is provided with a caliper and the like of a braking device which generates a braking force for the vehicle 2.

The upper connecting portion 6 connects a vertically upper portion of the suspension 5 to the vehicle body 4. Here, as described above, the upper connecting portion 6 connects the piston rod 14 of the shock absorber 10 as the vertically upper portion of the suspension 5 to the vehicle body 4. The upper connecting portion 6 is configured to include an upper support 60 as an upper intervening member which is intervened between the vertically upper end portion of the piston rod 14 and the vehicle body 4. The upper connecting portion 6 connects the piston rod 14 to the vehicle body 4 via the upper support 60. The upper support 60 elastically supports the vertically upper end portion of the piston rod 14 to the vehicle body 4.

The intermediate connecting portion 7 connects a vertically intermediate portion of the suspension 5 to the vehicle body 4. Here, as described above, the intermediate connecting portion 7 connects the upper arm 11 as the vertically intermediate portion of the suspension 5 to the vehicle body 4. The intermediate connecting portion 7 is configured to include an upper arm bushing 70 as an intermediate intervening member which is intervened between one end portion (end portion on the opposite side to the knuckle 13) of the upper arm 11 and the vehicle body 4. The intermediate connecting portion 7 connects the upper arm 11 to the vehicle body 4 via the upper arm bushing 70. The upper arm bushing 70 elastically supports one end portion of the upper arm 11 to the vehicle body 4.

The lower connecting portion 8 connects a vertically lower portion of the suspension 5 to the vehicle body 4. Here, as described above, the lower connecting portion 8 connects the lower arm 12 as the vertically lower portion of the suspension 5 to the vehicle body 4. The lower connecting portion 8 is configured to include a lower arm bushing 80 as a lower intervening member which is intervened between one end portion (end portion on the opposite side to the knuckle 13) of the lower arm 12 and the vehicle body 4. The lower connecting portion 8 connects the lower arm 12 to the vehicle body 4 via the lower arm bushing 80. The lower arm bushing 80 elastically supports one end portion of the lower arm 12 to the vehicle body 4.

The upper support 60, the upper arm bushing 70, and the lower arm bushing 80 are configured to include, for example, so-called rubber bushings made of an elastomer such as rubber. The upper support 60, the upper arm bushing 70, and the lower arm bushing 80 function as so-called compliance bushings which absorb vibration and the like in the vehicle front-back direction by allowing displacement while suppressing backlash of the upper connecting portion 6, the intermediate connecting portion 7, and the lower connecting portion 8. Accordingly, the upper support 60, the upper arm bushing 70, and the lower arm bushing 80 reduce, for example, action resistance between members having different movable axes and secures driving stability and ride quality. The stiffness (spring constants) of the upper connecting portion 6, the intermediate connecting portion 7, and the lower connecting portion 8 are respectively determined according to the stiffness of the upper support 60, the upper arm bushing 70, and the lower arm bushing 80.

Here, in the vehicle suspension device 1, for example, if the stiffness of the upper support 60 is increased due to the suspension design for the purpose of mainly enhancing driving stability including straight line stability, as the counteraction, there is concern that ride quality performance may deteriorate. Focusing on the phenomenon at the time of braking of the vehicle 2, in this case, in the vehicle suspension device 1, there is concern that vibration caused by a change in the braking torque may increase, and thus there is concern that unnecessary vibration may be transmitted to a driver through steering. In addition, in the vehicle suspension device 1, for example, if the stiffness of the lower arm bushing 80 is increased to reduce a brake vibration phenomenon at the time of braking, there is concern that harshness characteristics (performance of reducing vibration in the vehicle front-back direction, so-called harshness, input via the wheels 3 in a case where the vehicle 2 climbs over projections on the road surface while traveling and the like) may deteriorate as the counteraction. Here, the rubber bushings used in the upper support 60, the lower arm bushing 80, and the like have characteristics in that the relation between the displacement and the force is non-linear as illustrated in FIG. 2. Therefore, in the vehicle suspension device 1, if the stiffness of the bushing is simply increased to reduce brake vibration at the time of braking of the vehicle 2, the stiffness in a normal use range at the time of non-braking of the vehicle 2 and the like is also increased, and thus there is concern that various counteractions as described above may occur.

Here, in the vehicle suspension device 1 of this embodiment, the stiffness of the upper support 60 as the upper intervening member and the lower arm bushing 80 as the lower intervening member are set to have a predetermined relation depending on the braking state of the vehicle 2 to effectively use, for example, the geometry of the suspension 5 which changes when a braking torque is added, thereby reducing unsprung vibration in the vehicle front-back direction.

Here, in the vehicle suspension device 1, objects to be adjusted stiffness are the upper support 60 and the lower arm bushing 80. For example, in a case where a plurality of lower arms 12 and the like are provided in the vehicle front-back direction, the corresponding object to be adjusted stiffness is the lower arm bushing 80 of the lower arm 12 which mainly receives a load. For example, in a case where a lower arm No1 on the front side and a lower arm No2 on the rear side in the vehicle front-back direction are provided to form a pair as the lower arms 12, the object to be adjusted stiffness is the lower arm bushing 80 of the lower arm No2 which mainly receives a load.

Specifically, the upper support 60 is formed so that the front-back stiffness of the vehicle 2 is relatively decreased at the time of smooth-braking of the vehicle 2 at which the absolute value of the braking force of the vehicle 2 is relatively small, compared to at the time of non-braking of the vehicle 2. That is, the front-back stiffness of the upper support 60 at the time of smooth-braking of the vehicle 2 is relatively low compared to the front-back stiffness at the time of non-braking of the vehicle 2. On the other hand, the lower arm bushing 80 is formed so that the front-back stiffness of the vehicle 2 is relatively increased at the time of smooth-braking of the vehicle 2, compared to at the time of non-braking of the vehicle 2. That is, the front-back stiffness of the lower arm bushing 80 at the time of smooth-braking of the vehicle 2 is relatively high compared to the front-back stiffness at the time of non-braking of the vehicle 2. Accordingly, for example, the vehicle suspension device 1 achieves both driving stability (straight line stability) and reduction in brake vibration while suppressing a feeling of strangeness of the driver due to a change in harshness characteristics, thereby appropriately reducing unsprung vibration.

Here, the time of non-braking of the vehicle 2 is a state where no braking force is generated in the vehicle 2 and a state where the deceleration of the vehicle 2 is 0. The time of smooth-braking of the vehicle 2 is a braking state where the absolute value of the braking force of the vehicle 2 is relatively small and a state where the absolute value of the deceleration of the vehicle 2 is relatively small. Typically, the time of smooth-braking of the vehicle 2 mentioned here is a state where a braking force and a deceleration by which brake vibration occurs are applied and is determined according to, for example, the specification of the vehicle 2, the braking device, and the like. Specifically, the time of smooth-braking of the vehicle 2 is, for example, a smooth-braking range in which the deceleration of the vehicle 2 is from 0 G at the initial braking stage to about 0.3 G, more specifically, a smooth-braking range in which the deceleration causes brake vibration to be maximized, for example, is from 0 G to near 0.2 G. In addition, the time of sudden-braking of the vehicle 2 is a state where the absolute value of the braking force of the vehicle 2 is equal to or greater than a predetermined value set in advance and is a sudden-braking range in which the deceleration of the vehicle 2 is equal to or greater than a predetermined value set in advance.

The vehicle suspension device 1 allows the stiffness of the upper support 60 and the lower arm bushing 80 in the vehicle front-back direction to vary according to the braking state of the vehicle 2 and thus changes the principal elastic axis height of the suspension 5 by controlling the stiffness of the bushings, thereby reducing brake vibration.

FIG. 3 is a schematic view of the arrangement of the suspension 5 in a side view. In FIG. 3, "H" is the principal elastic axis height, "B" is the vehicle height, "$K_s$" is the spring characteristics of the shock absorber, "$K_Z$" is the vertical stiffness of the principal elastic axis, "$K_X$" is the front-back stiffness of the principal elastic axis, "X" is the front-back displacement of the spindle 19 (the position of unsprung center of gravity), "Z" is the vertical displacement of the spindle 19 (the position of unsprung center of gravity), "$\alpha$" is the inclination of the shock absorber with respect to the vertical direction, "$\beta$" is the inclination of the principal elastic axis with respect to the horizontal direction, "T" is the torque input at the time of braking, "F" is the input from the road surface (input at the time of harshness). In addition, the height H of the principal elastic axis corresponds to a relative distance along the vertical direction from a reference point on the wheels 3 side (for example, the spindle 19) to a reference point on the principal elastic axis. The vehicle height B corresponds to a relative distance along the vertical direction from a reference point on the wheels 3 side (for example, the spindle 19) to a reference point on the vehicle body 4 side (for example, mounting bolts on the vehicle body 4 side of the lower arm bushing 80). Hereinafter, description will be provided based on the model illustrated in FIG. 3.

Although an input from the road surface is considered at the time of harshness of vehicle 2, an input of the braking torque of the braking device serves as an input source at the time of braking of the vehicle 2. The relation between unsprung forces due to the braking torque is considered, for example, as illustrated in FIG. 4 from torque inputs exerted on each of a rotating part (tire) of the wheel 3 and a non-rotating part (the knuckle 13). That is, the inputs exerted on the rotating part of the wheel 3 include a braking torque input T to the rotating part, a front-back braking force $F_X$ exerted on the ground surface between the tire of the wheel 3 and the road surface, and a reaction force $-F_X$ of the front-back braking force exerted on the ground surface. In addition, in FIG. 4, "$r_0$" is the relative distance between the spindle 19 and the ground surface along the vertical direction. The inputs exerted on the non-rotating part of the wheel 3 include a braking torque input $-T$ to the non-rotating part, and a front-back reaction force $F_X$ from the rotating part to the non-rotating part. When synthesizing the inputs, the unsprung force due to the braking torque becomes an unsprung front-back input $F_X$ at the ground surface between the tire of the wheel 3 and the road surface.

Next, unsprung vibration will be described with reference to FIGS. 5 and 6 based on the relation between the geometry of the suspension 5 and the braking torque input. As in FIGS. 5 and 6, a displacement amount of the position of the spindle 19 (hereinafter, may be referred to as a "spindle position") with respect to the vehicle front-back direction varies depending on the principal elastic axis height in a case where the same level of force (for example, the front-back input $F_X$ described above) is applied to the ground surface. In FIG. 5, the principal elastic axis height is relatively high and is positioned on the upper side in the vertical direction with respect to the spindle position in this figure. On the other hand, in FIG. 6, the principal elastic axis height is relatively low and is positioned on the lower side in the vertical direction with respect to the spindle position in this figure. In addition, in FIGS. 5 and 6, "$K_X$'" is the front-back stiffness of the principal elastic axis, "$K_W$'" is the wind-up stiffness (the stiffness when the knuckle 13 rotates about the spindle 19).

When the principal elastic axis height is relatively high as illustrated in FIG. 5, a displacement amount L11 of the spindle position becomes a value obtained by adding a displacement amount L12 of a translational component of the exerted force and a displacement amount L13 of a rotational component. On the other hand, when the principal elastic axis height is relatively low as illustrated in FIG. 6, a displacement amount L21 of the spindle position has a tendency to be relatively decreased as much as a displacement amount L22 of the translational component of the exerted force and a displacement amount L23 of the rotational component cancel each other. Therefore, the unsprung front-back vibration at the time of braking is reduced as the principal elastic axis height becomes lower and the displacement amount of the spindle 19 is reduced as illustrated in FIG. 7. FIG. 7 illustrates a change in the unsprung front-back vibration when the principal elastic axis height is changed by changing the characteristics of the suspension 5 and illustrates that the unsprung front-back vibration is relatively increased in a case where the principal elastic axis height is relatively high and the unsprung front-back vibration is relatively decreased in a case where the principal elastic axis height is relatively low.

The vehicle suspension device 1 of this embodiment can change the principal elastic axis height by changing the front-back stiffness of the upper support 60 and the lower arm bushing 80 depending on the braking state as the characteristics of the suspension 5 as described above. As illustrated in FIG. 8, the principal elastic axis height has a tendency to decrease as the front-back stiffness of the upper support 60 is reduced and to decrease as the front-back stiffness of the lower arm bushing 80 is increased.

Furthermore, the vehicle suspension device 1 of this embodiment is configured so that, when the front-back stiffness of the upper support 60 and the lower arm bushing 80 are changed according to the braking state and the principal elastic axis height is changed, a front-back force compliance corresponding to the displacement amount of the spindle position when a front-back force is applied to the spindle position is maintained constant. FIG. 9 illustrates an example of a combination of the front-back stiffness of the upper support 60 and the front-back stiffness of the lower arm bushing 80 in which the front-back force compliance at the spindle position is constant. The front-back force compliance is changed according to the front-back stiffness of the upper support 60 and the front-back stiffness of the lower arm bushing 80. In FIG. 9, the solid line L indicates an assembly of combinations of the front-back stiffness of the upper support 60 and the front-back stiffness of the lower arm bushing 80 in which the front-back force compliance is constant at a predetermined value. Accordingly, the vehicle suspension device 1 can suppress an influence on harshness characteristics.

Based on the above description, in the vehicle suspension device 1 of this embodiment, the upper support 60 and the lower arm bushing 80 are configured so that the front-back stiffness of the upper support 60 is relatively decreased and the front-back stiffness of the lower arm bushing 80 is relatively increased at the time of smooth-braking of the vehicle 2 compared to the front-back stiffness at the time of non-braking of the vehicle 2. Accordingly, as illustrated in FIG. 8, in the vehicle suspension device 1, the principal elastic axis height changes from an operation point P1 which represents the principal elastic axis height at the time of non-braking of the vehicle 2 to an operation point P2 which represents the principal elastic axis height at the time of smooth-braking, thereby reducing the principal elastic axis height.

Here, the front-back stiffness of the upper support 60 and the front-back stiffness of the lower arm bushing 80 are set so that the front-back force compliance of the spindle 19 of the wheel 3 at the time of smooth-braking of the vehicle 2 is equal to the front-back force compliance of the spindle 19 at the time of non-braking of the vehicle 2. That is, as illustrated in FIG. 9, the front-back stiffness of the upper support 60 and the lower arm bushing 80 are variable so that the combination of the front-back stiffness of the upper support 60 and the front-back stiffness of the lower arm bushing 80 at the operation point P1 and the combination of the front-back stiffness of the upper support 60 and the front-back stiffness of the lower arm bushing 80 at the operation point P2 are both positioned on the solid line L. Accordingly, the vehicle suspension device 1 can reduce the principal elastic axis height while maintaining the front-back force compliance in a constant level at the time of smooth-braking of the vehicle 2.

Moreover, the upper support 60 is configured so that the front-back stiffness of the vehicle 2 is relatively increased at the time of sudden-braking of the vehicle 2 compared to the front-back stiffness at the time of smooth-braking. Accordingly, the vehicle suspension device 1 increases the principal elastic axis height at the time of sudden-braking of the vehicle 2 at which an influence on brake vibration or harshness characteristics and the like may not be considered, thereby enhancing driving stability.

FIG. 10 illustrates an example of the relation between the displacement and the force of the upper support 60, and FIG. 11 illustrates an example of the relation between the displacement and the force of the lower arm bushing 80. Here, the upper support 60 and the lower arm bushing 80 are configured so that by using the non-linear characteristics as illustrated in FIG. 2, the bushing stiffness use ranges including the normal use range such as at the time of non-braking and the like, the smooth-braking range such as at the time of smooth-braking, and the sudden-braking range such as at the time of sudden-braking are adjusted to actively change the geometry of the suspension 5 at the time of non-braking and the like, at the time of smooth-braking, and at the time of sudden-braking. The upper support 60 is configured to have bushing characteristics as illustrated in FIG. 10 so that the front-back stiffness thereof varies according to the braking state. That is, the upper support 60 may be assembled to be configured to have bushing characteristics in which the front-back stiffness is relatively high in the normal use range, is relatively decreased in the smooth-braking range, and is relatively increased again in the sudden-braking range. The lower arm bushing 80 is configured to have bushing characteristics as illustrated in FIG. 11 in which the front-back stiffness varies according to the braking state. That is, the lower arm bushing 80 may be assembled to be configured to have bushing characteristics in which the front-back stiffness is relatively low in the normal use range, and is relatively increased in the smooth-braking range and in the sudden-braking range.

FIGS. 12 and 13 respectively illustrate examples of the configurations of the upper support 60 and the lower arm bushing 80 in which the front-back stiffness varies according to the braking state. FIGS. 12 and 13 illustrate the configurations of cases where the center axis lines of the cylindrical members of the upper support 60 and the lower arm bushing 80 cross the front-back direction of the vehicle 2.

As illustrated in FIG. 12, the upper support 60 is configured to include an outer cylinder 61, an inner cylinder 62, an elastic body 63, and the like. The outer cylinder 61 and the inner cylinder 62 are cylindrical members that extend along the height direction of the vehicle body 4. The inner cylinder 62 is inserted into the outer cylinder 61. Any one of the outer cylinder 61 and the inner cylinder 62 is provided on the piston rod 14 side and the other is provided on the vehicle body 4 side. Here, for example, the outer cylinder 61 is provided to a bracket on the vehicle body 4 side, and the inner cylinder 62 is provided on the piston rod 14 side. The elastic body 63 is made of an elastomer such as rubber and is provided in a cylindrical shape so as to be intervened between the outer cylinder 61 and the inner cylinder 62 in the radial direction (a direction intersecting the front-back direction). That is, the elastic body 63 is disposed on the inner circumferential side of the outer cylinder 61 and on the outer circumferential side of the inner cylinder 62. In the upper support 60, the outer cylinder 61 and the inner cylinder 62 are relatively displaced along the radial direction at the time of braking. In addition, in the upper support 60, the elastic body 63 is provided with a pair of recesses (bored cavity parts) 64 and 65, and by adjusting the shapes, positions, and the like thereof, the bushing stiffness use ranges and bushing characteristics are adjusted.

Here, the recesses 64 and the recesses 65 are formed to extend together along the direction perpendicular to the front-back direction (for example, the vehicle width direction). In addition, the recesses 64 and the recesses 65 are disposed at positions that oppose each other with the inner cylinder 62 intervened therebetween in the vehicle front-back direction. In the upper support 60, the recesses 64 and the recesses 65 are provided in the elastic body 63 to be assembled in the outer cylinder 61 and the inner cylinder 62 to achieve a state in which the recesses 65 are crushed and the recesses 64 are not crushed at the time of non-braking. Here, the recesses 65 are positioned on a side where the front-back interval between the outer cylinder 61 and the inner cylinder 62 at the time of braking increases, and the recesses 64 are positioned on a side where the front-back interval between the outer cylinder 61 and the inner cylinder 62 at the time of braking decreases. Therefore, the upper support 60 achieves a state in which the recesses 64 are not crushed and the recesses 65 are crushed in the normal use range and thus achieves a state in which the front-back stiffness is relatively high and deformation is less likely to occur. Moreover, in the upper support 60, the outer cylinder 61 and inner cylinder 62 are relatively displaced along the radial direction in the smooth-braking range to achieve a state in which both the recesses 64 and the recesses 65 are not crushed. Accordingly, the upper support 60 achieves a state in which the front-back stiffness is relatively low and deformation is more likely to occur. Further, in the upper support 60, the outer cylinder 61 and inner cylinder 62 are further relatively displaced along the radial direction in the sudden-braking range and thus the recesses 64 are crushed while the recesses 65 are not crushed. Accordingly, the upper support 60 achieves a state in which the front-back stiffness is relatively high again and deformation is less likely to occur. Therefore, the upper support 60 can realize bushing characteristics in which the front-back stiffness is relatively high in the normal use range, is relatively decreased in the smooth-braking range, and is relatively increased again in the sudden-braking range.

As illustrated in FIG. 13, the lower arm bushing 80 is configured to include an outer cylinder 81, an inner cylinder 82, an elastic body 83, and the like. The outer cylinder 81 and the inner cylinder 82 are cylindrical members that extend along the vehicle width direction of the vehicle body 4. The inner cylinder 82 is inserted into the outer cylinder 81. Any one of the outer cylinder 81 and the inner cylinder 82 is provided on the lower arm 12 side and the other is provided on the vehicle body 4 side. Here, for example, the outer cylinder 81 is provided to a bracket on the lower arm 12 side, and the inner cylinder 82 is provided to a pin or a bolt on the vehicle body 4 side. The elastic body 83 is made of an elastomer such as rubber and is provided in a cylindrical shape so as to be intervened between the outer cylinder 81 and the inner cylinder 82 in the radial direction (the direction intersecting the front-back direction). That is, the elastic body 83 is disposed on the inner circumferential side of the outer cylinder 81 and on the outer circumferential side of the inner cylinder 82. In the lower arm bushing 80, the outer cylinder 81 and the inner cylinder 82 are relatively displaced along the radial direction at the time of braking. In addition, in the lower arm bushing 80, the elastic body 83 is provided with a pair of recesses 84 and a pair of recesses 85, and by adjusting the shapes, positions, and the like thereof, the bushing stiffness use ranges and bushing characteristics are adjusted.

Here, the recesses 84 and the recesses 85 are formed to extend together along the direction perpendicular to the front-back direction (for example, the height direction). In addition, the recesses 84 and the recesses 85 are disposed at positions that oppose each other with the inner cylinder 82 intervened therebetween in the vehicle front-back direction. In the lower arm bushing 80, the recesses 84 and the recesses 85 are provided in the elastic body 83 to be assembled in the outer cylinder 81 and the inner cylinder 82 so that the recesses 84 and the recesses 85 are not crushed at the time of non-braking. Here, the recesses 84 are positioned on a side where the front-back interval between the outer cylinder 81 and the inner cylinder 82 at the time of braking decreases, and the recesses 85 are positioned on a side where the front-back interval between the outer cylinder 81 and the inner cylinder 82 at the time of braking increases. Therefore, the lower arm bushing 80 achieves a state in which both the recesses 84 and the recesses 85 are not crushed in the normal use range and thus achieves a state in which the front-back stiffness is relatively low and deformation is more likely to occur. Moreover, in the lower arm bushing 80, the outer cylinder 81 and inner cylinder 82 are relatively displaced along the radial direction in the smooth-braking range to achieve a state in which the recesses 84 are slightly crushed. Accordingly, the lower arm bushing 80 achieves a state in which the front-back stiffness is relatively high and deformation is less likely to occur. Further, in the lower arm bushing 80, the outer cylinder 81 and inner cylinder 82 are further relatively displaced along the radial direction in the sudden-braking range and thus the recesses 84 are maintained in a crushed state such that the front-back stiffness is relatively high and the lower arm bushing 80 is maintained in a state in which deformation is less likely to occur. Therefore, the lower arm bushing 80 can realize bushing characteristics in which the front-back stiffness is relatively low in the normal use range, and is relatively increased in the smooth-braking range and in the sudden-braking range.

The vehicle suspension device 1 configured as described above achieves a state in which the front-back stiffness of the upper support 60 is relatively high and the front-back stiffness of the lower arm bushing 80 is relatively low in the normal use range such as at the time of non-braking of the vehicle 2 (see the operation point P1 of FIGS. 8 and 9). Accordingly, in the vehicle suspension device 1, the principal elastic axis height of the suspension 5 is relatively high in the normal use range such as at the time of non-braking of the vehicle 2, thereby securing driving stability.

Moreover, in the vehicle suspension device 1, in the smooth-braking range such as at the time of smooth-braking of the vehicle 2, when the braking torque is added, the upper support 60 and the lower arm bushing 80 are deformed as described above so that the front-back stiffness of the upper support 60 is relatively decreased and the front-back stiffness of the lower arm bushing 80 is relatively increased (see the operation point P2 of FIG. 8), thereby changing the geometry of the suspension 5. At this time, in the vehicle suspension device 1, the front-back stiffness of the upper support 60 and the lower arm bushing 80 are changed while the front-back force compliance of the spindle 19 is substantially constant (see the operation point P2 of FIG. 9). Accordingly, in the vehicle suspension device 1, not only the principal elastic axis height is changed by simply increasing the front-back stiffness of the lower arm bushing 80 at the time of smooth-braking, but also the front-back stiffness of the upper support 60 is decreased according to the increase in the front-back stiffness of the lower arm bushing 80, thereby decreasing the principal elastic axis height while maintaining the front-back force compliance in a constant level. As a result, in the vehicle suspension device 1, brake vibration is reduced by decreasing the principal elastic axis height, and then the front-back force compliance is held to be constant, thereby suppressing an influence on harshness characteristics.

Furthermore, in the vehicle suspension device 1, in the sudden-braking range such as at the time of sudden-braking of the vehicle 2 at which the braking force of the vehicle 2 is relatively increased, the upper support 60 and the lower arm bushing 80 are further deformed as described above so that the front-back stiffness of the upper support 60 is relatively increased again (see an operation point P3 of FIGS. 8 and 9). Accordingly, the vehicle suspension device 1 increases the principal elastic axis height at the time of sudden-braking of the vehicle 2 at which an influence on brake vibration or harshness characteristics and the like may not be considered, thereby enhancing driving stability.

The vehicle suspension device 1 according to the embodiment described above includes the suspension 5, the upper support 60, and the lower arm bushing 80. The suspension 5 supports the wheels 3 of the vehicle 2 to the vehicle body 4 of the corresponding vehicle 2. The upper support 60 is intervened between the vertically upper portion of the suspension 5 and the vehicle body 4, and the front-back stiffness of the vehicle 2 is relatively decreased at the time of smooth-braking of the vehicle 2 at which the absolute value of the braking force of the vehicle 2 is relatively small, compared to at the time of non-braking of the vehicle 2. The lower arm bushing 80 is intervened between the vertically lower portion of the suspension 5 and the vehicle body 4 and the front-back stiffness of the vehicle 2 is relatively increased at the time of smooth-braking of the vehicle 2, compared to at the time of non-braking of the vehicle 2.

Therefore, in the vehicle suspension device 1, the front-back stiffness of the upper support 60 is decreased and the front-back stiffness of the lower arm bushing 80 is increased at the time of smooth-braking of the vehicle 2 compared to at the time of non-braking, thereby decreasing the principal elastic axis height of the suspension 5 while holding a change in the front-back force compliance at a low level. As a result, the vehicle suspension device 1 achieves both driving stability enhancement and a reduction in brake vibration while suppressing a feeling of strangeness of the driver due to a change in harshness characteristics, thereby appropriately reducing unsprung vibration.

FIGS. 14 and 15 are diagrams in which the vehicle suspension device 1 configured as descried above are compared to vehicle suspension devices according to Comparative Examples 1 and 2. Here, in the vehicle suspension device according to Comparative Example 1, the relation between the stiffness of the upper support and the lower arm bushing is not changed at the time of smooth-braking and at the time of non-braking of the vehicle and the principal elastic axis height of the suspension 5 is held at a relatively high position even at the time of smooth-braking. In the vehicle suspension device according to Comparative Example 2, only the stiffness of the lower arm bushing is increased without considering the front-back force compliance at the time of smooth-braking of the vehicle to relatively decrease the principal elastic axis height of the suspension 5.

As also apparent from FIG. 14, it can be understood that unsprung front-back vibration L31 in the vehicle suspension device 1 of this embodiment and unsprung front-back vibration L32 in the vehicle suspension device according to Comparative Example 2 are reduced to be smaller than unsprung front-back vibration L33 in the vehicle suspension device according to Comparative Example 1. In addition, as also apparent from FIG. 15, it can be understood that although harshness characteristics L41 in the vehicle suspension device 1 of this embodiment and harshness characteristics L42 in the vehicle suspension device according to Comparative Example 2 are enhanced compared to harshness characteristics L43 in the vehicle suspension device according to Comparative Example 1, the harshness characteristics L42 that do not consider front-back force compliance are degraded compared to the harshness characteristics L41 of this embodiment. Therefore, it can be understood that the vehicle suspension device 1 of this embodiment achieves both driving stability enhancement and a reduction in brake vibration while suppressing a feeling of strangeness of the driver due to a change in harshness characteristics.

The vehicle suspension device according to the above-described embodiment of the present invention is not limited to the above-described embodiment and can be modified in various forms in a range described in the appended claims.

FIGS. 16 and 17 respectively illustrate examples of the configurations of an upper support 260 as an upper intervening member and a lower arm bushing 280 as a lower intervening member according to modified examples, in which the front-back stiffness varies according to the braking state. FIGS. 16 and 17 illustrate the configurations of cases where the center axis lines of the cylindrical members of the upper support 260 and the lower arm bushing 280 are disposed along the front-back direction of the vehicle 2.

As illustrated in FIG. 16, the upper support 260 is configured to include an outer cylinder 261, an inner cylinder 262, an elastic body 263, and the like. The outer cylinder 261 and the inner cylinder 262 are cylindrical members that extend along the front-back direction of the vehicle body 4. The inner cylinder 262 is inserted into the outer cylinder 261. Any one of the outer cylinder 261 and the inner cylinder 262 is provided on the piston rod 14 side and the other is provided on the vehicle body 4 side. Here, for example, the outer cylinder 261 is provided to a bracket on the vehicle body 4 side, and the inner cylinder 262 is provided on the piston rod 14 side. The elastic body 263 is made of an elastomer such as rubber and is provided in a cylindrical shape so as to be intervened between the outer cylinder 261 and the inner cylinder 262 in the radial direction. That is, the elastic body 263 is disposed on the inner circumferential side of the outer cylinder 261 and on the outer circumferential side of the inner cylinder 262. In the upper support 260, the outer cylinder 261 and the inner cylinder 262 are relatively displaced along the axial direction (the front-back direction) at the time of braking. In addition, in the upper support 260, protruding edge portions 261a and 261b having an annular shape are respectively provided on both front-back end surfaces of the outer cylinder 261, and stopper portions 262a and 262b having a disk shape are respectively provided on both front-back end surfaces of the inner cylinder 262. Furthermore, in the upper support 260, protruding edge portions 263a and 263b having an annular shape are respectively provided on both front-back end surfaces of the elastic body 263. In the upper support 260, the outer cylinder 261, the inner cylinder 262, and the elastic body 263 may be assembled in the following positional relation. That is, in the upper support 260, the stopper portion 262a and the protruding edge portion 261a oppose each other at a predetermined interval in the front-back direction, and the stopper portion 262b and the protruding edge portion 261b oppose each other at a predetermined interval. In the upper support 260, the protruding edge portion 263a is positioned between the stopper portion 262a and the protruding edge portion 261a, and the protruding edge portion 263b is positioned between the stopper portion 262b and the protruding edge portion 261b. In the upper support 260, by controlling the interval between the stopper portion 262a and the protruding edge portion 261a, the interval between the stopper portion 262b and the protruding edge portion 261b, and the like, the bushing stiffness use ranges and bushing characteristics are adjusted.

In the upper support 260, the outer cylinder 261, the inner cylinder 262, and the elastic body 263 may be assembled to achieve a state in which the protruding edge portion 263b is crushed and the protruding edge portion 263a is not crushed at the time of non-braking. Here, the protruding edge portion 263b is positioned on a side where the front-back interval between the stopper portion 262b and the protruding edge portion 261b at the time of braking increases, and the protruding edge portion 261a is positioned on a side where the front-back interval between the stopper portion 262a and the protruding edge portion 261a at the time of braking decreases. Therefore, the upper support 260 achieves a state in which the protruding edge portion 263a is not crushed and the protruding edge portion 263b is crushed in the normal use range and thus achieves a state in which the front-back stiffness is relatively high and deformation is less likely to occur. Moreover, in the upper support 260, the front-back interval between the stopper portion 262a and the protruding edge portion 261a decreases and the front-back interval between the stopper portion 262b and the protruding edge portion 261b increases at the time of smooth-braking to achieve a state in which both the protruding edge portions 263a and 263b are not crushed. Accordingly, the upper support 260 achieves a state in which the front-back stiffness is relatively low and deformation is more likely to occur. Further, in the upper support 260, the front-back interval between the stopper portion 262a and the protruding edge portion 261a further decreases and the front-back interval between the stopper portion 262b and the protruding edge portion 261b further increases at the time of sudden-braking to achieve a state in which the protruding edge portion 263a is crushed and the protruding edge portion 263b is not crushed. Accordingly, the upper support 260 achieves a state in which the front-back stiffness is relatively high again and deformation is less likely to occur. Therefore, the upper support 260 can realize bushing characteristics in which the front-back stiffness is relatively high in the normal use range, is relatively decreased in the smooth-braking range, and is relatively increased again in the sudden-braking range.

As illustrated in FIG. 17, the lower arm bushing 280 is configured to include an outer cylinder 281, an inner cylinder 282, an elastic body 283, and the like. The outer cylinder 281 and the inner cylinder 282 are cylindrical members that extend along the front-back direction of the vehicle body 4. The inner cylinder 282 is inserted into the outer cylinder 281. Any one of the outer cylinder 281 and the inner cylinder 282 is provided on the lower arm 12 side and the other is provided on the vehicle body 4 side. Here, for example, the outer cylinder 281 is provided to a bracket on the lower arm 12 side, and the inner cylinder 282 is provided on the vehicle body 4 side. The elastic body 283 is made of an elastomer such as rubber and is provided in a cylindrical shape so as to be intervened between the outer cylinder 281 and the inner cylinder 282 in the radial direction. That is, the elastic body 283 is disposed on the inner circumferential side of the outer cylinder 281 and on the outer circumferential side of the inner cylinder 282. In the lower arm bushing 280, the outer cylinder 281 and the inner cylinder 282 are relatively displaced along the axial direction (the front-back direction) at the time of braking. In addition, in the lower arm bushing 280, protruding edge portions 281a and 281b having an annular shape are respectively provided on both front-back end surfaces of the outer cylinder 281, and stopper portions 282a and 282b having a disk shape are respectively provided on both front-back end surfaces of the inner cylinder 282. Furthermore, in the lower arm bushing 280, protruding edge portions 283a and 283b having an annular shape are respectively provided on both front-back end surfaces of the elastic body 283. In the lower arm bushing 280, the outer cylinder 281, the inner cylinder 282, and the elastic body 283 may be assembled in the following positional relation. That is, in the lower arm bushing 280, the stopper portion 282a and the protruding edge portion 281a oppose each other at a predetermined interval in the front-back direction, and the stopper portion 282b and the protruding edge portion 281b oppose each other at a predetermined interval. In the lower arm bushing 280, the protruding edge portion 283a is positioned between the stopper portion 282a and the protruding edge portion 281a, and the protruding edge portion 283b is positioned between the stopper portion 282b and the protruding edge portion 281b. In the lower arm bushing 280, by controlling the interval between the stopper portion 282a and the protruding edge portion 281a, the interval between the stopper portion 282b and the protruding edge portion 281b, and the like, the bushing stiffness use ranges and bushing characteristics are adjusted.

In the lower arm bushing 280, the outer cylinder 261, the inner cylinder 262, and the elastic body 263 may be assembled to achieve a state in which the protruding edge portions 283a and 283b are not crushed at the time of non-braking. Here, the protruding edge portion 283b is positioned on a side where the front-back interval between the stopper portion 282b and the protruding edge portion 281b at the time of braking increases, and the protruding edge portion 281a is positioned on a side where the front-back interval between the stopper portion 282a and the protruding edge portion 281a at the time of braking decreases. Therefore, the lower arm bushing 280 achieves a state in which both the protruding edge portions 283a and 283b are not crushed in the normal use range and thus achieves a state in which the front-back stiffness is relatively low and deformation is more likely to occur. Moreover, in the lower arm bushing 280, the front-back interval between the stopper portion 282a and the protruding edge portion 281a decreases and the front-back interval between the stopper portion 282b and the protruding edge portion 281b increases at the time of smooth-braking to achieve a state in which the protruding edge portion 283a is crushed and the protruding edge portion 283b is not crushed. Accordingly, the lower arm bushing 280 achieves a state in which the front-back stiffness is relatively high and deformation is less likely to occur. Further, in the lower arm bushing 280, the front-back interval between the stopper portion 282a and the protruding edge portion 281a further decreases and the front-back interval between the stopper portion 282b and the protruding edge portion 281b further increases at the time of sudden-braking to achieve a state in which the protruding edge portion 283a is maintained in the crushed state. Accordingly, the lower arm bushing 280 is maintained in a state in which the front-back stiffness is relatively high and deformation is less likely to occur. Therefore, the lower arm bushing 280 can realize bushing characteristics in which the front-back stiffness is relatively low in the normal use range and is relatively increased in the smooth-braking range and in the sudden-braking range.

Even in this case, in the vehicle suspension device 1, the front-back stiffness of the upper support 60 is decreased and the front-back stiffness of the lower arm bushing 80 is increased at the time of smooth-braking of the vehicle 2 compared to at the time of non-braking, thereby decreasing the principal elastic axis height of the suspension 5 while holding a change in the front-back force compliance at a low level. As a result, the vehicle suspension device 1 achieves both driving stability enhancement and a reduction in brake vibration while suppressing a feeling of strangeness of the driver due to a change in harshness characteristics, thereby appropriately reducing unsprung vibration.

In addition, the suspension device main body described above is not limited to the above-described configuration and, for example, may have a configuration in which the upper arm 11 is not provided and the vertically lower end portion of the cylinder 15 is connected to the upper end portion of the knuckle 13 via a joint portion such as a ball joint.

REFERENCE SIGNS LIST

1 VEHICLE SUSPENSION DEVICE
2 VEHICLE
3 WHEEL
4 VEHICLE BODY
5 SUSPENSION (SUSPENSION DEVICE MAIN BODY)
6 UPPER CONNECTING PORTION
7 INTERMEDIATE CONNECTING PORTION
8 LOWER CONNECTING PORTION
9 COIL SPRING
10 SHOCK ABSORBER
11 UPPER ARM
12 LOWER ARM
13 KNUCKLE
14 PISTON ROD
15 CYLINDER
16, 17, 18 JOINT PORTION
19 SPINDLE
60, 260 UPPER SUPPORT (UPPER INTERVENING MEMBER)
61, 81, 261, 281 OUTER CYLINDER
62, 82, 262, 282 INNER CYLINDER
63, 83, 263, 283 ELASTIC BODY
64, 65, 84, 85 HOLLOW
70 UPPER ARM BUSHING 80, 280 LOWER ARM BUSHING (LOWER INTERVENING MEMBER)

The invention claimed is:

1. A vehicle suspension device comprising:
a suspension device main body configured to support a wheel of a vehicle to a vehicle body of the vehicle;
an upper intervening member configured to be intervened between a vertically upper portion of the suspension device main body and the vehicle body so that a front-back stiffness of the vehicle is relatively decreased at a time of smooth-braking of the vehicle at which an absolute value of a braking force of the vehicle is relatively small, compared to at a time of non-braking of the vehicle; and
a lower intervening member configured to be intervened between a vertically lower portion of the suspension device main body and the vehicle body so that the front-back stiffness of the vehicle is relatively increased at the time of smooth-braking of the vehicle, compared to at the time of non-braking of the vehicle,
wherein a front-back stiffness of the upper intervening member and a front-back stiffness of the lower intervening member are set so that a front-back force compliance of a spindle of the wheel at the time of smooth-braking of the vehicle and a front-back force compliance of the spindle at the time of non-braking of the vehicle are equal to each other.

2. A vehicle suspension device comprising:
a suspension device main body configured to support a wheel of a vehicle to a vehicle body of the vehicle;
an upper intervening member configured to be intervened between a vertically upper portion of the suspension device main body and the vehicle body so that a front-back stiffness of the vehicle is relatively decreased at a time of smooth-braking of the vehicle at which an absolute value of a braking force of the vehicle is relatively small, compared to at a time of non-braking of the vehicle; and
a lower intervening member configured to be intervened between a vertically lower portion of the suspension device main body and the vehicle body so that the front-back stiffness of the vehicle is relatively increased at the time of smooth-braking of the vehicle, compared to at the time of non-braking of the vehicle,
wherein in the upper intervening member, the front-back stiffness of the vehicle is relatively increased at a time of sudden-braking of the vehicle at which an absolute value of a braking force of the vehicle is relatively greater than that at the time of smooth-braking of the vehicle, compared to at the time of smooth-braking of the vehicle.

3. The vehicle suspension device according to claim 1, wherein in the upper intervening member, the front-back stiffness of the vehicle is relatively increased at a time of sudden-braking of the vehicle at which an absolute value of a braking force of the vehicle is relatively greater than that at the time of smooth-braking of the vehicle, compared to at the time of smooth-braking of the vehicle.

* * * * *